United States Patent
White

[15] 3,662,525
[45] May 16, 1972

[54] SOYBEAN HARVESTING APPARATUS

[72] Inventor: Allen A. White, Peabody, Kans.

[73] Assignee: Hesston Corporation, Hesston, Kans.

[22] Filed: May 4, 1970

[21] Appl. No.: 34,297

[52] U.S. Cl. .................................. 56/2, 56/13.7, 56/123, 56/155
[51] Int. Cl. ........................................ A01d 41/00
[58] Field of Search ............... 56/2, 126, 130, 136, 13.9, 56/14.4, 14.6, 122, 123, 13.7, 155

[56] References Cited

UNITED STATES PATENTS

| | | | |
|---|---|---|---|
| 2,867,962 | 1/1959 | Meyer | 56/123 X |
| 3,399,517 | 9/1968 | Magee | 56/13.9 |
| 2,636,331 | 4/1953 | Price | 56/122 |
| 2,765,612 | 10/1956 | Raumaker et al. | 56/2 X |

*Primary Examiner*—Antonio F. Guida
*Assistant Examiner*—J. N. Eskovitz
*Attorney*—Schmidt, Johnson, Hovey & Williams

[57] ABSTRACT

A soybean harvesting unit, adapted for attachment to the cutter bar of a combine header forwardly of its pan and beneath its reel, includes a forwardly and downwardly inclined, open-top trough pivotally supported for vertical flotation, an oscillatory cutter at the crop-receiving inlet of the trough, and a double joint coupling between the cutter and the knife sections of the reciprocable combine sickle to drive the cutter up and down during movement of the trough. As the plants enter the inlet and are severed, the reel sweeps the severed plants through the trough into the pan while the sidewalls of the trough slidably support and guide overhanging branches of the plants to prevent the latter from falling to the ground.

12 Claims, 9 Drawing Figures

INVENTOR.
Allen A. White
BY Schmidt, Johnson, Hovey,
Williams & Chase
ATTORNEYS.

INVENTOR.
Allen A. White
BY Schmidt, Johnson, Hovey, Williams & Chase
ATTORNEYS.

INVENTOR.
Allen A. White
BY Schmidt, Johnson, Hovey,
Williams & Chase
ATTORNEYS.

SOYBEAN HARVESTING APPARATUS

This invention relates to an attachment for farm implements, adapting the latter for harvesting row crops, especially soybeans.

Equipment heretofore available for harvesting soybeans has not proven entirely satisfactory in that harvesting efficiency has remained considerably lower than for other grains. Harvesting losses have ranged from 6 percent to 25 percent with average losses exceeding 10 percent. Such losses can be mainly attributed to the fact that harvesting equipment used for soybeans was primarily designed for other grains having characteristics which differ greatly from those of the soybean plant. For instance, a combine, which is especially designed for harvesting relatively tall gains not planted in rows, such as wheat and oats, has commonly been used. On the other hand, soybeans are normally planted in spaced rows, and ripe bean pods are supported relatively close to the ground. The long combine header traverses several bean rows at one time during advancement across the field and, consequently, uneven ground between the ends of the header tends to lift the latter and prevent plants in low areas from being severed at their bases. This results in a substantial number of bean pods being left behind. In this regard, it has been estimated that approximately 1.4 bushels of soybeans per acre are lost for every inch above the ground that the plants are severed. Manifestly, economic loss is greatly magnified by the number of acres which are planted in soybeans each year.

In addition, a substantial amount of beans is lost when the pods are shattered, causing the beans to fall to the ground and avoid being picked up by the harvester. Shattering may occur either when a direct force strikes the pod, as when a bat reel is used on the combine, or when the pod is directly severed by the sickle when the header is not close to the ground.

Serious loss also occurs from bean plants falling from the front of the combine header onto the ground. This is caused at least in part by the fact that limbs of the plants often droop from the weight of the bean pods into adjacent furrows between the rows. When such plants are severed, the weighted limbs tend to pull the plants into the furrow, and the header then passes over the plants without gathering them into the machine.

In view of these problems, it is an important object of the present invention to provide apparatus which is designed to minimize harvesting losses and is especially suited for, but not limited to, the harvesting of soybeans. In furtherance of this object, an important aim of the invention is to provide, as part of such apparatus, harvesting units which are capable of individual bean row flotation in order to compensate for uneven ground along each row, thereby permitting the cutter of each unit to remain close to the ground during severance of the plants.

Another important object of this invention is to provide harvesting apparatus which may be mounted on the header of a conventional combine without extensive modification of the latter to adapt the combine for efficient soybean harvesting. This serves the dual purpose of avoiding the expense of acquiring a special machine for harvesting beans, while at the same time expanding the operating capabilities of the existing combine.

Closely associated with the above object is the goal of providing harvesting units which may be quickly and easily attached to and removed from the header to accommodate changes in row spacing.

A further important object of the instant invention is to provide harvesting apparatus having cutter means which may be driven by reciprocation of the combine sickle, thereby eliminating the need for an independent drive source for the cutter means and hence simplifying the construction of the apparatus and lowering the cost thereof. In this regard, simplified construction provides easy accessibility to components of the apparatus for repair or replacement of worn parts and, in addition, obviates the need for specially trained servicemen.

An additional important object of this invention is the provision of a coupling for operably connecting the combine sickle with the cutter of each harvesting unit which permits continued operation of the cutters as the units rise and fall over uneven ground.

Yet another important object of this invention is to provide means for clamping the above-mentioned coupling directly to one or more knife sections of the sickle.

A still further important object of the invention is to prevent bean plants from falling to the ground after severance thereof by providing an open-top trough associated with each harvesting unit which collects the plants as they are severed and guides the latter as they are swept to the rear for threshing. This object is accomplished primarily by providing at the trough inlet, a mouth which receives the plants prior to severance, and by specially configured trough sides which support overhanging branches of the plants as the latter are swept through the trough.

A further aim of the invention is to provide shield structure which may be mounted on the header between adjacent units to prevent the combine sickle from severing foreign material between adjacent rows whereby to eliminate collection of such material along with the harvested beans.

Figure 1:
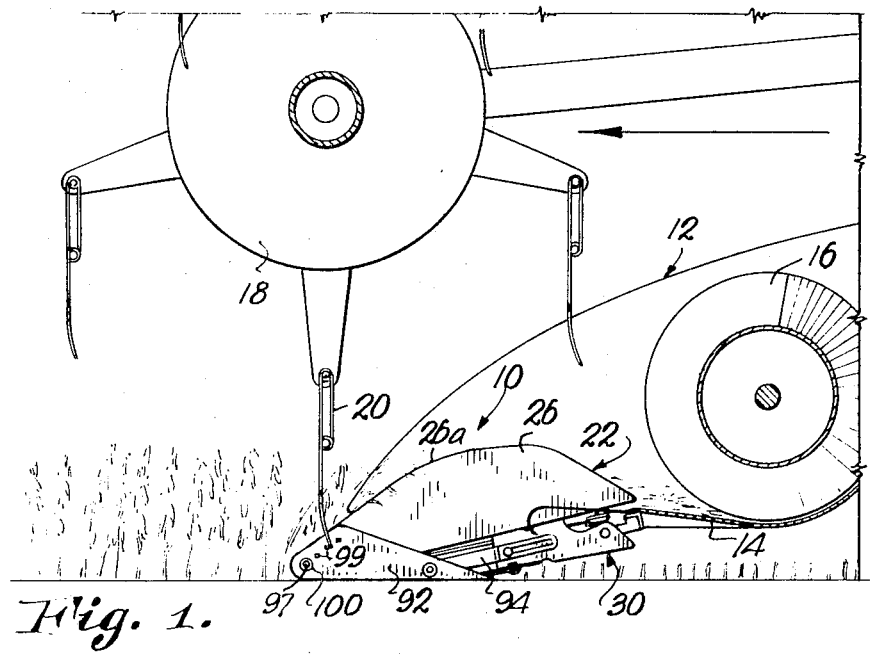
FIG. 1 is a fragmentary, vertical cross-sectional view of a combine header showing in elevation, and attached to the header, a soybean harvesting unit embodying the principles of the present invention.
Figure 2:
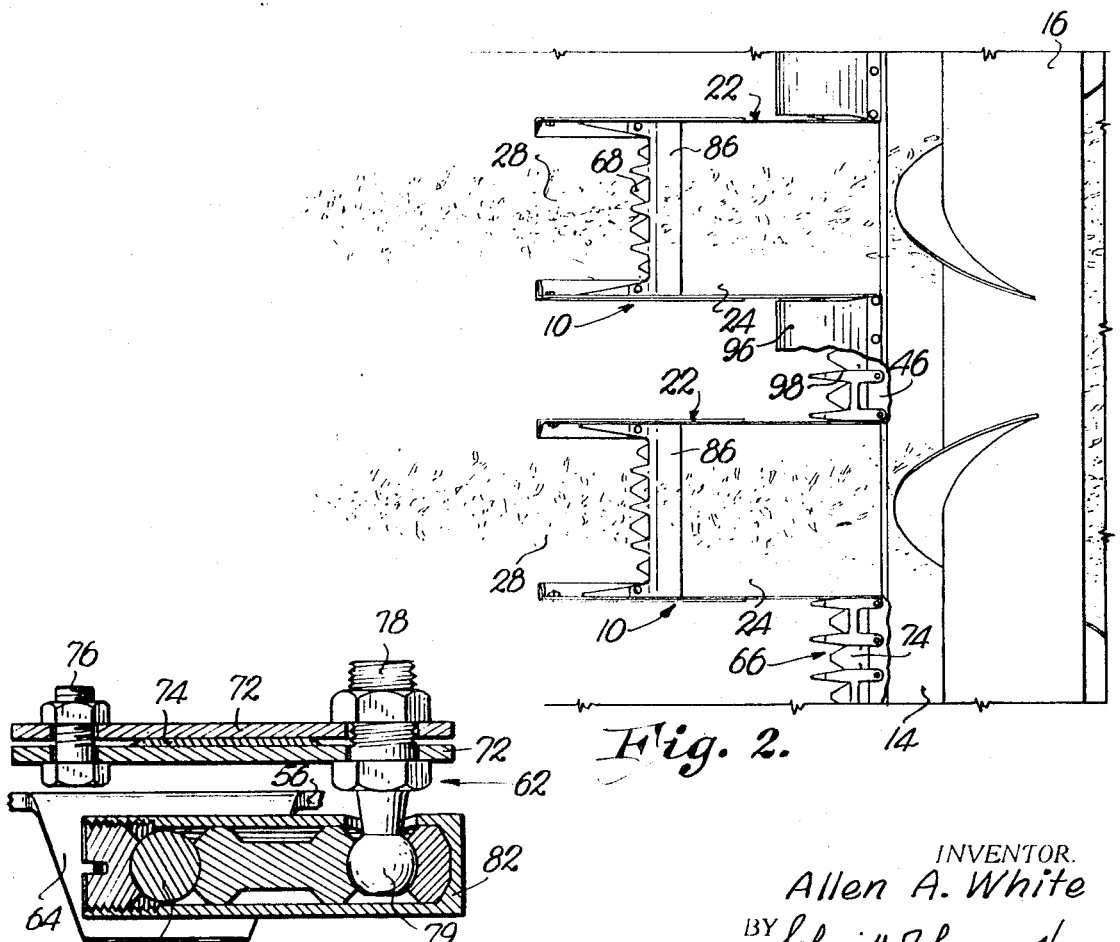
FIG. 2 is a fragmentary plan view of the header with the combine reel removed and showing a pair of units attached to the header with parts of one of the shields between the units broken away.

Referring to FIGS. 1 and 2, a number of harvesting units 10 are attached to the header 12 of a combine forwardly of the combine pan 14 within which a crop-gathering auger 16 rotates, units 10 being disposed beneath combine reel 18 having retractable fingers 20. Each unit 10 includes an open top, U-shaped trough 22 open at its front and rear ends to present a front, crop-receiving inlet and a rear, crop-discharging outlet respectively, a bottom 24, and a pair of upright sidewalls 26 having generally arcuate uppermost edges 26a. The bottom 24 stops short of the forwardmost portions of trough 22 to present a crop-receiving mouth 28 defined by the interior surfaces of sidewalls 26 and the leading edge of bottom 24.

As shown best in FIGS. 3-8, a generally U-shaped mounting bracket 30 has a pair of downturned sides 32 (FIG. 3) and a narrow bight 34 (FIG. 4) spanning the distance therebetween directly below trough bottom 24. The upper edges of sides 32 rearwardly of bight 34 are rigidly welded to bottom 24. A pair of triangular gussets 36 (FIGS. 4 and 7) extend between sides 32 and bight 34, and inturned and outturned flanges 38 and 40 respectively extend from the bottom edges of sides 32, the inturned flanges 38 being rearwardly of flanges 40.

A generally C-shaped mounting bar 42 (FIG. 4) between the bracket sides 32 has a bight 44 which is rigidly secured to the combine cutter bar 46 using the same bolts 48 which normally fasten the cutter guards (now removed) to bar 46; only certain guards need be removed in order to properly mount the units 10 to header 12. Each leg 50 (FIG. 5) of bar 42 carries a bearing bolt 52 which extends through a respective bracket side 32 to pivotally mount the bracket 30 and trough 22 for swinging movement about a substantially horizontal axis.

The rearmost end of trough 22 projects slightly into the pan 14 (FIG. 3), and a pair of adjustable stops 54 (FIGS. 3 and 6) are threaded into opposite ends of each leg 50 to strike the inturned flanges 38 for limiting the extent of swinging movement of unit 10.

A generally triangular, oscillatory plate 56, below trough 22, has a central bearing 58 which is journaled on a stub shaft 60 projecting downwardly from and rigid to bight 34 of bracket 30. Coupling structure 62 (FIG. 9) serves to connect a downturned ear 64 (FIG. 5) of plate 56 with the reciprocable sickle 66 of the combine to drive plate 56 when sickle 66 is in operation. Four knife sections 68 are secured to the leading edge of plate 56 and cooperate with shearing edges of a multifingered tie plate 70 secured beneath plate 56 to the outturned flanges 40 by bolts 71. As shown most clearly in FIGS. 4 and 7, the two outer sections 68 are set back slightly from the two middle sections to compensate for the oscillatory movement of plate 56 during operation. The cutting edges of all four sections 68 are disposed forwardly of the leading edge of trough bottom 24 within mouth 28.

Figure 9:
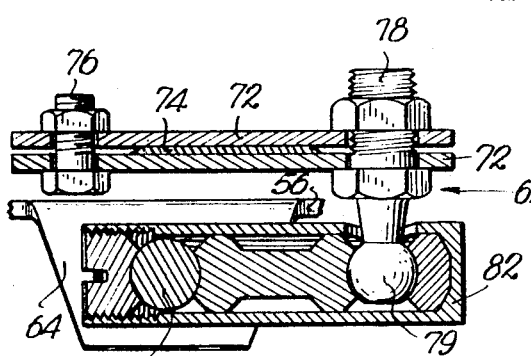
FIG. 9 is an enlarged, fragmentary, detailed cross-sectional view taken along line 9—9 of FIG. 4.
Figure 3:
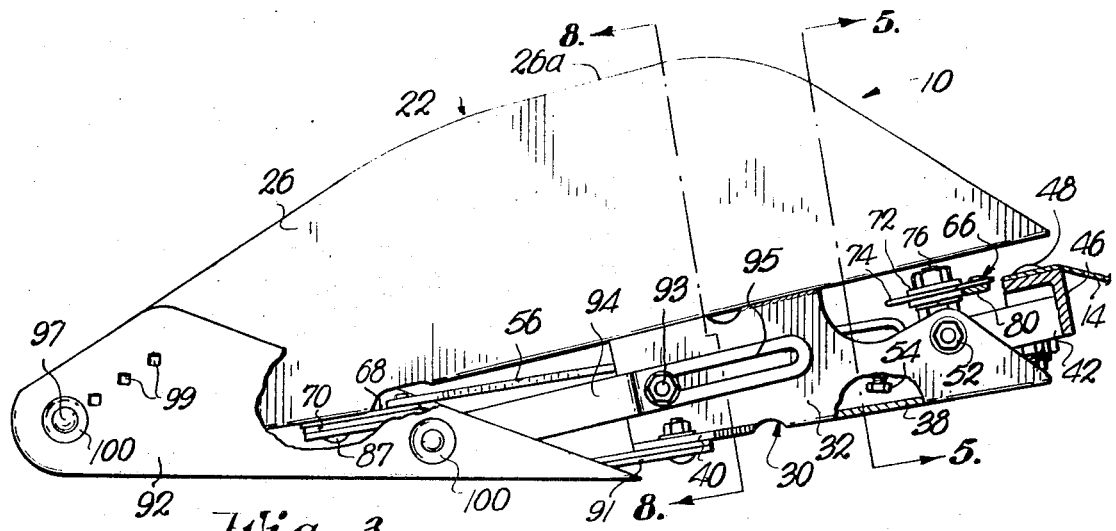
FIG. 3 is an enlarged side elevational view of one of the harvesting units, parts being broken away and in cross section for clarity.
Figure 4:
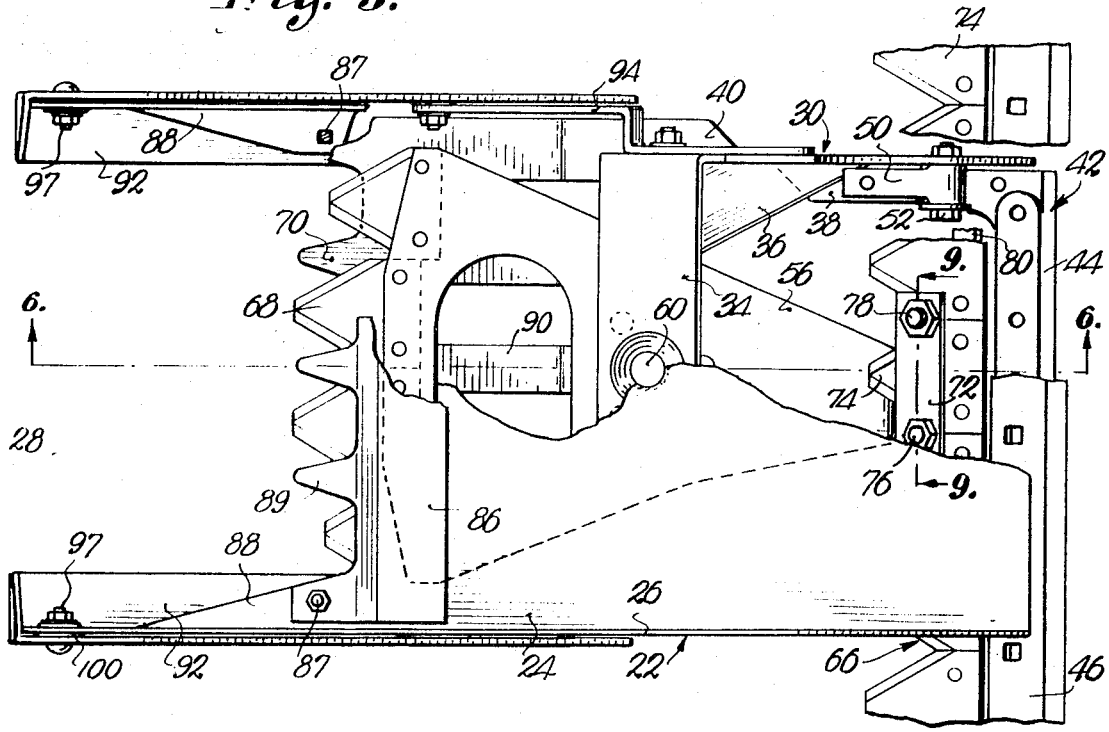
FIG. 4 is a top plan view of the unit shown in FIG. 3, parts being broken away to reveal details of construction.
Figure 5:
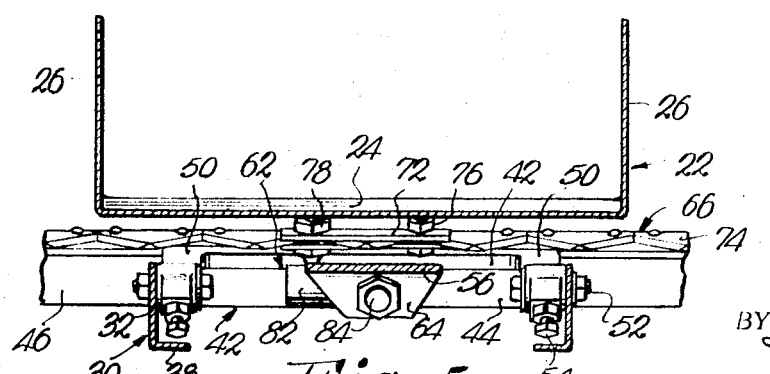
FIG. 5 is a cross-sectional view taken along line 5—5 of FIG. 3.
Figure 6:
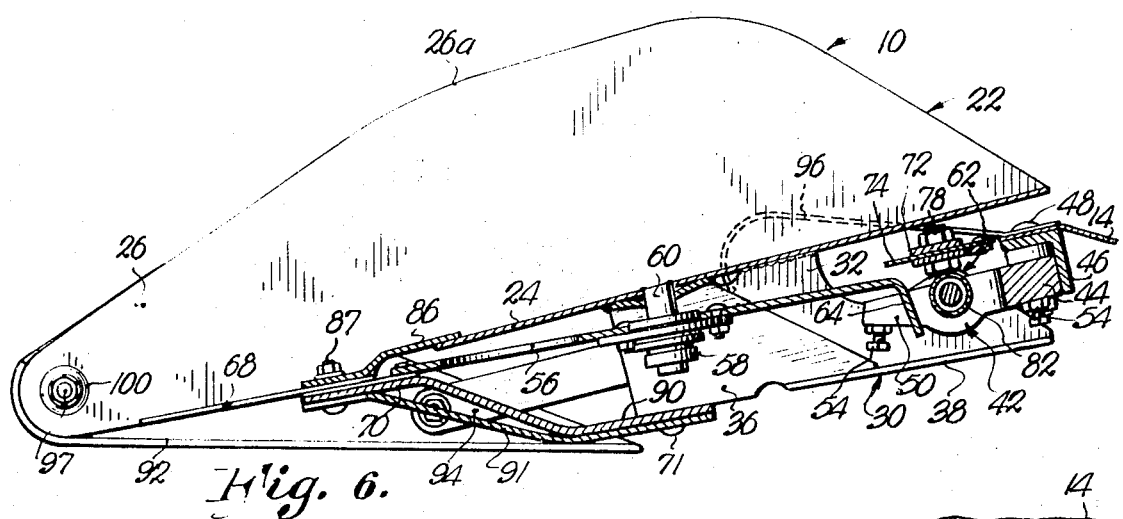
FIG. 6 is a cross-sectional view taken along line 6—6 of FIG. 4.
Figure 7:
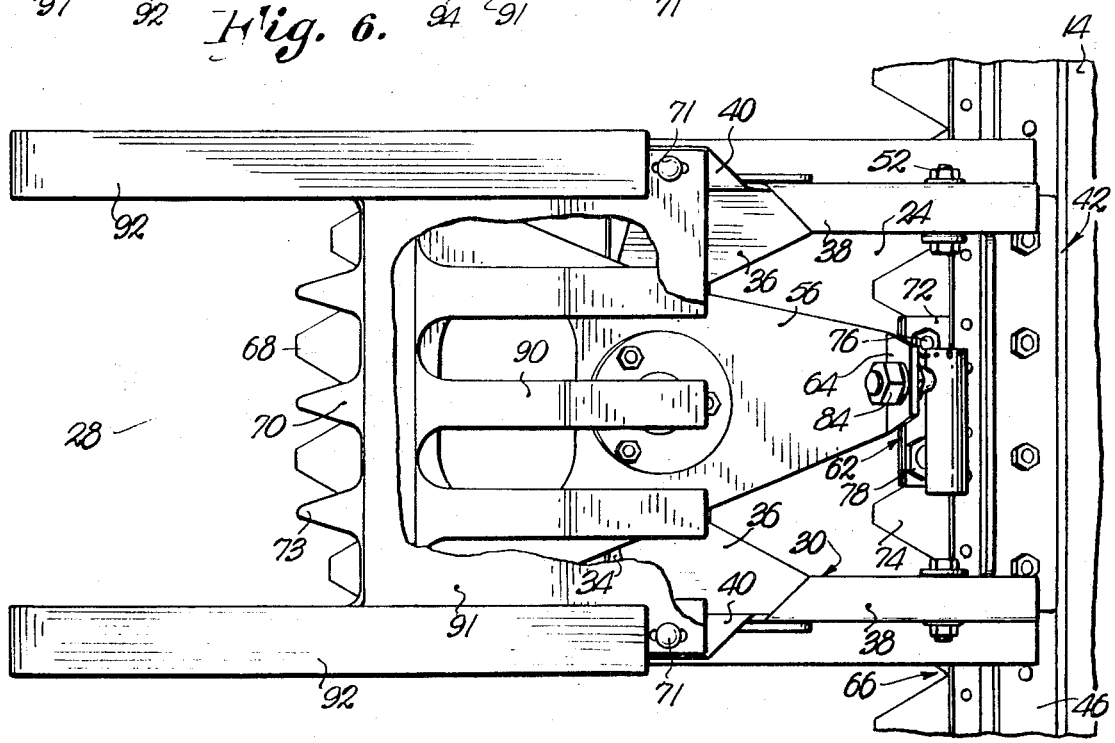
FIG. 7 is a bottom view of the unit shown in FIGS. 3-6.
Figure 8:
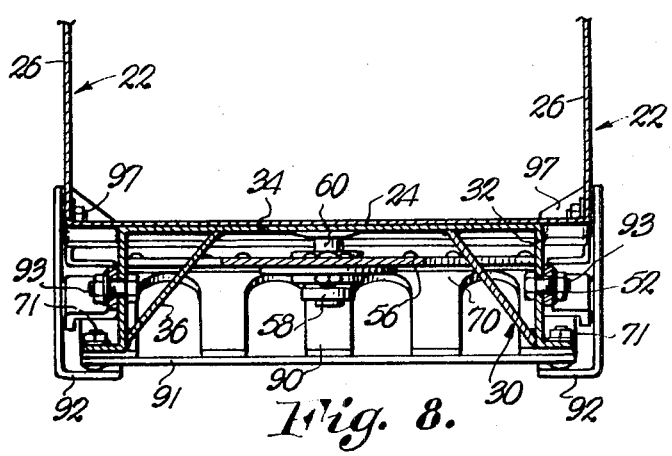
FIG. 8 is a cross-sectional view of the unit taken along line 8—8 of FIG. 3.

Referring particularly to FIGS. 4, 7 and 9, the coupling structure 62 includes a pair of superimposed plates 72 which firmly clamp a sickle section 74 therebetween by means of a pair of bolts 76 and 78. The lower plate 72 abuts the sickle bar 80, the bolts 76 and 78 each engage a pair of sections 74 therebetween, and the opposite ends of plates 72 clamp portions of adjacent sections 74 therebetween, all for the purpose of preventing movement of the plates 72 relative to sickle 66. The bolt 78 has a ball and socket connection 79 with a double joint coupler 82 beneath the plates 72, and a second ball and socket connection 81 is made with coupler 82 by a bolt 84 attached to and extending from downturned ear 64 (FIGS. 5 and 7). Structure 62 thereby primarily permits transmission of rectilinear reciprocation of the sickle 66 to oscillation of the plate 56, and secondarily, swinging of plate 56 about a horizontal axis with trough 22 while sickle 66 reciprocates.

An upper, multi-fingered tie plate 86 is secured to inturned, triangular flanges 88 on trough walls 26 by bolts 87, the fingers 89 of plate 86 overlying and holding down the sections 68 of plate 56. The bottom tie plate 70 has a plurality of rearwardly extending, integral skids 90 beneath plate 56 which ride on the ridge of each crop row during harvesting to prevent the cutter sections 68 from digging into the soil. The self-cleaning skids 90 are best for muddy conditions, but otherwise it is desirable to use a removable skid plate 91 beneath skids 90 and held in place by bolts 71 and 87, the latter also serving to mount the plate 70.

In addition, elongated, ground-engaging shoes 92 are pivoted to the forward ends of trough sides 26 and project rearwardly, terminating adjacent mounting bracket 30. Straps 94 pivoted to the rear portions of shoes 92 are adjustably secured at their opposite ends to respective sides 32 of bracket 30 to vary the forward inclination of trough 22 as may readily be seen in FIG. 3. Loosening of bolts 93 permits the straps 94 to slide in slots 95 of the straps 94 so as to swing the shoes 92 about their pivot bolts 97. Any one of a number of holes 99 in shoes 92 may be used to receive the bolts 97, depending on the adjustment of the straps 94 so that the shoes 92 will not ride on their rearmost heels when shoes 92 are swung down substantially away from the skids 90 or the plate 91.

Referring particularly to FIG. 2, when a number of the units 10 are to be attached to header 12, it is often necessary or desirable to space the units 10 apart rather than mounting them in side-by-side relationship. In such instances, it may be desirable to utilize shield structure 96 which may be bolted directly to cutter bar 46 between adjacent units 10 to prevent the sickle 66 from severing crops or other material between beam rows. Viewing FIG. 6, the shield 96 has an arcuate, downturned portion at its outer end and may easily be mounted on cutter bar 46 at its inner end utilizing the bolts 48 for guards 98 between the adjacent units 10.

Preparing the harvesting units 10 for use is a relatively simple matter. There is no need to make extensive changes or modifications in the equipment used in association with the units 10, particularly if such equipment is a conventional combine having a header 12 and a sickle 66. When row spacing has been determined, it is but necessary to remove certain of the guards 98 and substitute therefor the appropriate number of units 10, utilizing the removed guard bolts 48 for securing the mounting bars 42 to cutter bar 46. Thereafter, the oscillatory cutter plate 56 may be operably connected to sickle 66 by clamping a number of appropriate sickle sections 74 between plates 72. There is no need to drill mounting holes of any kind into the sections 74 or otherwise modify the structure of sickle 66 and hence possibly affect its operation adversely when the combine is used for other purposes. Further, disposing the bottom plate 72 in abutting relationship with sickle bar 80 and clamping more than one section 74 at a time insures that coupling structure 62 will not shake loose or damage the cutting edges of the sections 74 during operation.

The shield structure 96 may be secured to cutter bar 46 between the adjacent units 10 if desired. In this regard, it is suggested that shields 96 of varying lengths be maintained in the event that row spacing in one field differs from that of another field. In some instances it may be desirable to place the units 10 in side-by-side relationship with a minimum of spacing therebetween and at such times, the provision of dimples 100 on shoes 92, which receive the mounting bolts 97 therefor, prevents any unnecessary contact between adjacent units 10 during individual flotation thereof.

As the combine advances through the field, reciprocation of sickle 66 causes the cutter plates 56 of each unit 10 to oscillate about a substantially vertical axis through shaft 60, resulting in a scissor-like action between the knife sections 68 and fingers 73 of the lower tie plate 70. Viewing FIGS. 1 and 2 in particular, the plants in each row are swept into mouth 28 by reel 18 upon advancement of the combine, are severed by knife sections 68, and pass along trough 22 through the outlet and into the combine pan 14 for subsequent threshing. The provision of mouth 28 insures that the plants are substantially within trough 22 prior to severance thereof such that there is little likelihood of the plants falling to the ground upon severance as is the case with harvesting equipment heretofore available. Further, the arcuate, uppermost edges 26a of trough sides 26 serve to support the overhanging branches of the plants as they are severed to thereby guide the plants and pull in the overhanging branches as the plants pass through the trough 22.

As the combine travels along the rows, variations in the terrain along each row are compensated for by the individual flotation capabilities of each unit 10. When a rise or fall in the ground is encountered, bracket 30 swings about bearing bolts 52 in stationary mounting bar 42 to the extent permitted by stops 54, thereby maintaining the knife sections 68 close to the ground for severing the plants at their bases. Inasmuch as the units 10 are individually mounted, ground variations along one row do not affect the cutting height of units 10 in adjacent rows. Therefore, the problem of ground variations in one row controlling the cutting height in all adjacent rows is eliminated.

The harvesting attachments 10 eliminate many of the problems associated with soybean harvesting losses which have heretofore been experienced. The provision of individual bean row flotation in particular insures that harvesting losses will be held to a minimum. The relatively simple manner of construction, accessibility to working components of the units 10, and ease of mounting the units 10 on present combines suggest that the units 10 would be in great demand.

Having thus described the invention, what is claimed as new and desired to be secured by Letters Patent is:

1. In combination with the frame of a farm implement and a member reciprocably carried by the frame, a crop harvesting unit comprising:

an open top trough having a leading crop-receiving inlet and a trailing crop-discharging outlet;

means mounting said trough on the frame with said inlet spaced from the member forwardly of the latter;

a cutter mounted on the trough; and means operably coupling the member with said cutter for driving the latter upon reciprocation of the member whereby crops entering said inlet during advancement of the implement are severed by the cutter for passage along the trough and through said outlet, said member being a sickle having a plurality of knife sections, said coupling means operably connecting the cutter with at least one of said sections.

2. The invention as claimed in claim 1, wherein means between the units is provided for shielding the sickle to prevent severance of the crop by the sickle.

3. The invention as claimed in claim 1, wherein said coupling means includes an upper and a lower element having means clamping said one section therebetween.

4. The invention as claimed in claim 1, wherein said trough is provided with ground-engaging means, said mounting means pivotally supporting the trough for swinging movement in response to variations in terrain, said coupling means pivotally coupling the member with the cutter for swinging of the latter as a unit with the trough.

5. In combination with the frame of a farm implement and a member reciprocably carried by the frame, a crop harvesting unit comprising:

an open top trough having a leading crop-receiving inlet and a trailing crop-discharging outlet;

means mounting said trough on the frame with said inlet spaced from the member forwardly of the latter;

a cutter mounted on the trough; and means operably coupling the member with said cutter for driving the latter upon reciprocation of the member whereby crops entering said inlet during advancement of the implement are severed by the cutter for passage along the trough and through said outlet, said trough being provided with ground-engaging means, said mounting means pivotally supporting the trough for swinging movement in response to variations in terrain, said ground-engaging means being shiftably attached to the trough for varying the height of the latter relative to the ground.

6. The invention as claimed in claim 1, wherein said trough is provided with ground-engaging means, said mounting means pivotally supporting the trough for swinging movement in response to variations in terrain, said ground-engaging means comprising skid means secured to the trough therebeneath.

7. The invention as claimed in claim 1, wherein said trough is provided with ground-engaging means, said mounting means pivotally supporting the trough for swinging movement in response to variations in terrain, said ground-engaging means comprising a plate releasably secured to the trough therebeneath.

8. The invention as claimed in claim 4, wherein said mounting means is provided with stops engageable by the trough for limiting the extent of swinging movement of the latter.

9. In combination with the frame of a farm implement and a member reciprocably carried by the frame, a crop harvesting unit comprising:

an open trough having a leading crop-receiving inlet and a trailing crop-discharging outlet;

means mounting said trough on the frame with said inlet spaced from the member forwardly of the latter;

a cutter mounted on the trough; and structure means operably coupling the member with said cutter for driving the latter upon reciprocation of the member whereby crops entering said inlet during advancement of the implement are severed by the cutter for passage along the trough and through said outlet, the reciprocation of the member being rectilinear, the cutter oscillating on the trough, said coupling means including a double joint assembly for allowing said swinging movement of the trough relative to the frame and permitting transmission of the reciprocable movement of the member to the oscillatory movement of the cutter.

10. In combination with the frame of a farm implement and a member reciprocably carried by the frame, a crop harvesting unit comprising:

an open top trough having a leading crop-receiving inlet and a trailing crop-discharging outlet;

means mounting said trough on the frame with said inlet spaced from the member forwardly of the latter;

a cutter mounted on the trough;

structure means operably coupling the member with said cutter for driving the latter upon reciprocation of the member whereby crops entering said inlet during advancement of the implement are severed by the cutter for passage along the trough and through said outlet, the reciprocation of the member being rectilinear; and means on the trough supporting the cutter for oscillation across said inlet, said coupling means including a coupling device operably connecting the member with the cutter for oscillating the latter upon said reciprocation of the member.

11. The invention as claimed in claim 10, wherein said trough is pivotally mounted on the frame for swinging movement about a first substantially horizontal axis, said coupling means pivotally coupling the member with the cutter for swinging the latter as a unit with the trough about a second substantially horizontal axis.

12. The invention as claimed in claim 11, wherein said member is a sickle having a plurality of knife sections, said coupling means coupling the cutter with a number of said sections.

* * * * *